United States Patent [19]

McMahan et al.

[11] Patent Number: 4,599,681

[45] Date of Patent: Jul. 8, 1986

[54] VEHICLE HEADLAMP ASSEMBLY

[75] Inventors: David R. McMahan; Richard W. Nicholas, both of Anderson, Ind.

[73] Assignee: General Motors Corp., Detroit, Mich.

[21] Appl. No.: 743,089

[22] Filed: Jun. 10, 1985

Related U.S. Application Data

[63] Continuation-in-part of Ser. No. 678,026, Dec. 4, 1984, abandoned.

[51] Int. Cl.⁴ .............................................. B60Q 1/00
[52] U.S. Cl. ...................................... 362/80; 362/275; 362/287; 362/430
[58] Field of Search ................... 362/80, 61, 269, 273, 362/275, 282, 285, 287, 288, 299, 362, 368, 370, 371, 374, 375, 382, 396, 427, 428, 430

[56] References Cited

U.S. PATENT DOCUMENTS

| | | | |
|---|---|---|---|
| 3,612,854 | 10/1971 | Todd et al. | 362/269 |
| 4,333,131 | 6/1982 | Hujimoto et al. | 362/289 |
| 4,414,614 | 11/1983 | McMahan et al. | 362/287 |
| 4,415,956 | 11/1983 | McMahan | 362/285 |
| 4,491,901 | 1/1985 | Sigety | 362/287 |

FOREIGN PATENT DOCUMENTS 1196143 7/1965 Fed. Rep. of Germany ...... 362/273

Primary Examiner—Charles J. Myhre
Assistant Examiner—David A. Okonsky
Attorney, Agent, or Firm—Edward J. Biskup

[57] ABSTRACT

A headlamp assembly which includes a support bracket that carries a pair of headlamp units in side-by-side relationship and is attached to a support housing at three pivot points so as to allow simultaneous adjustable positioning of the headlamp units about a horizontal axis or a vertical axis.

3 Claims, 7 Drawing Figures

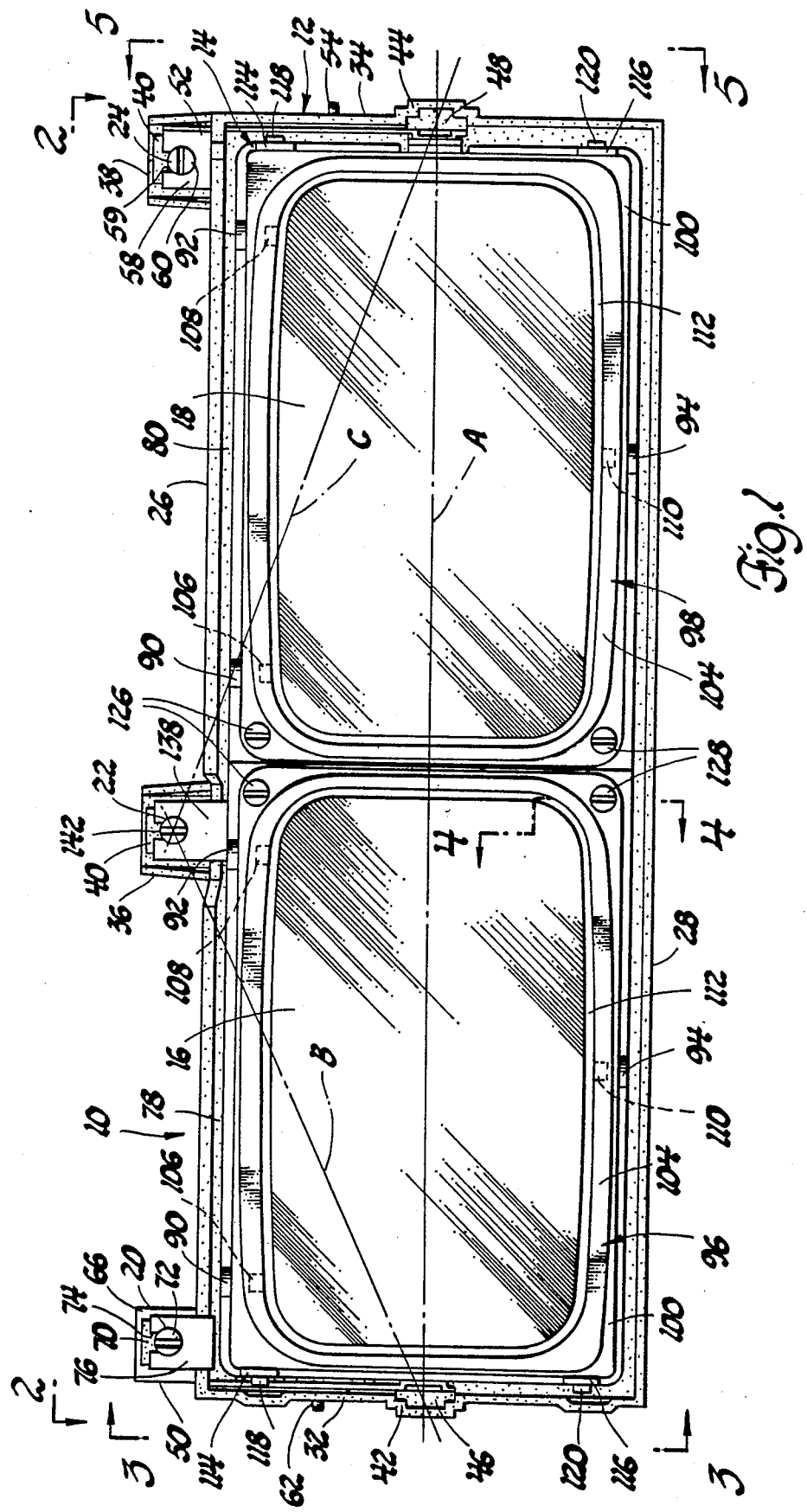

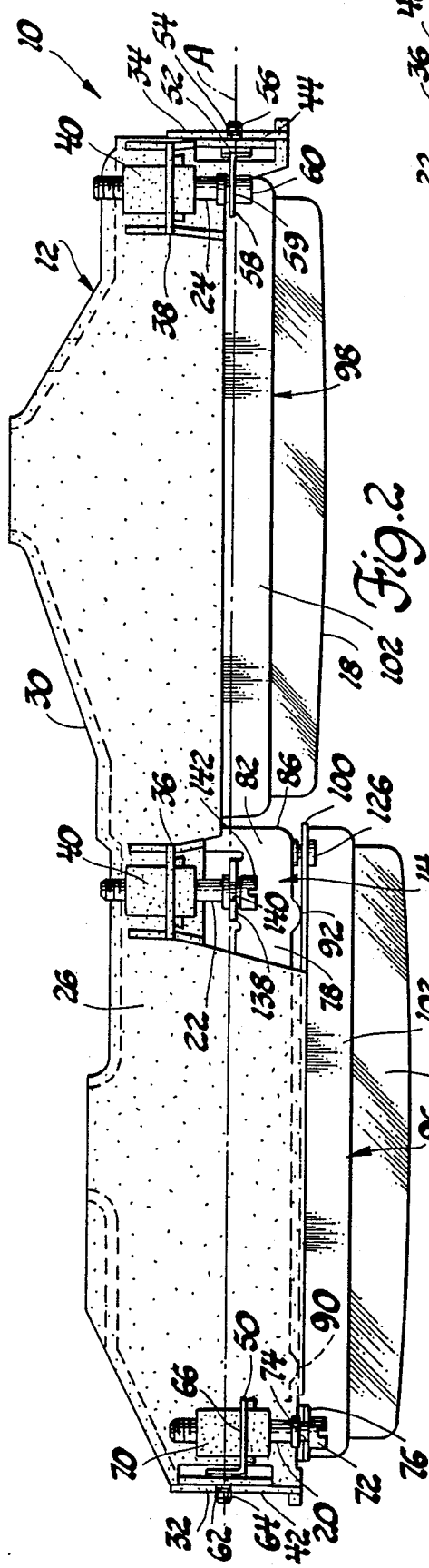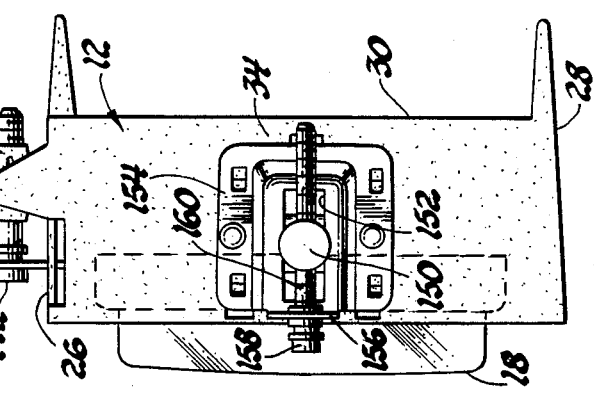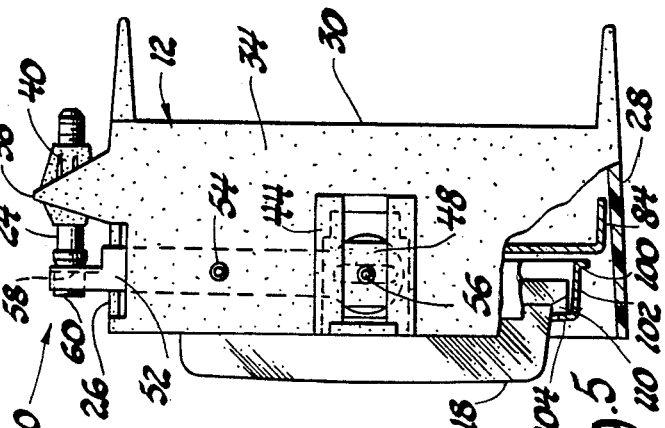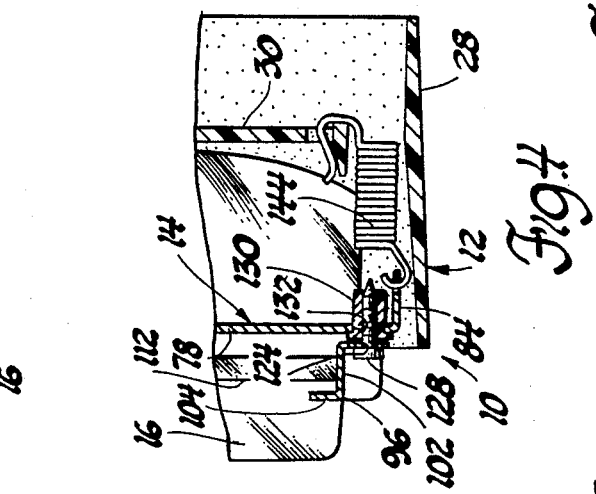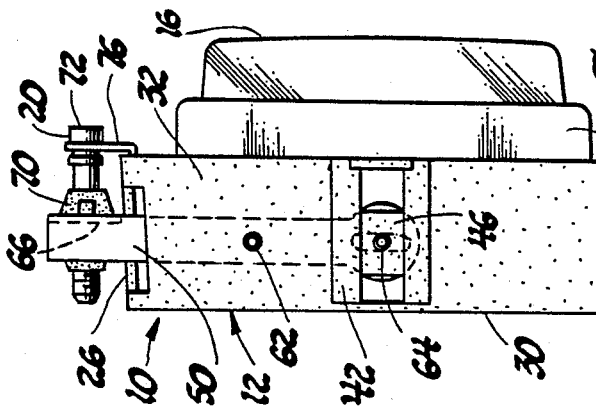

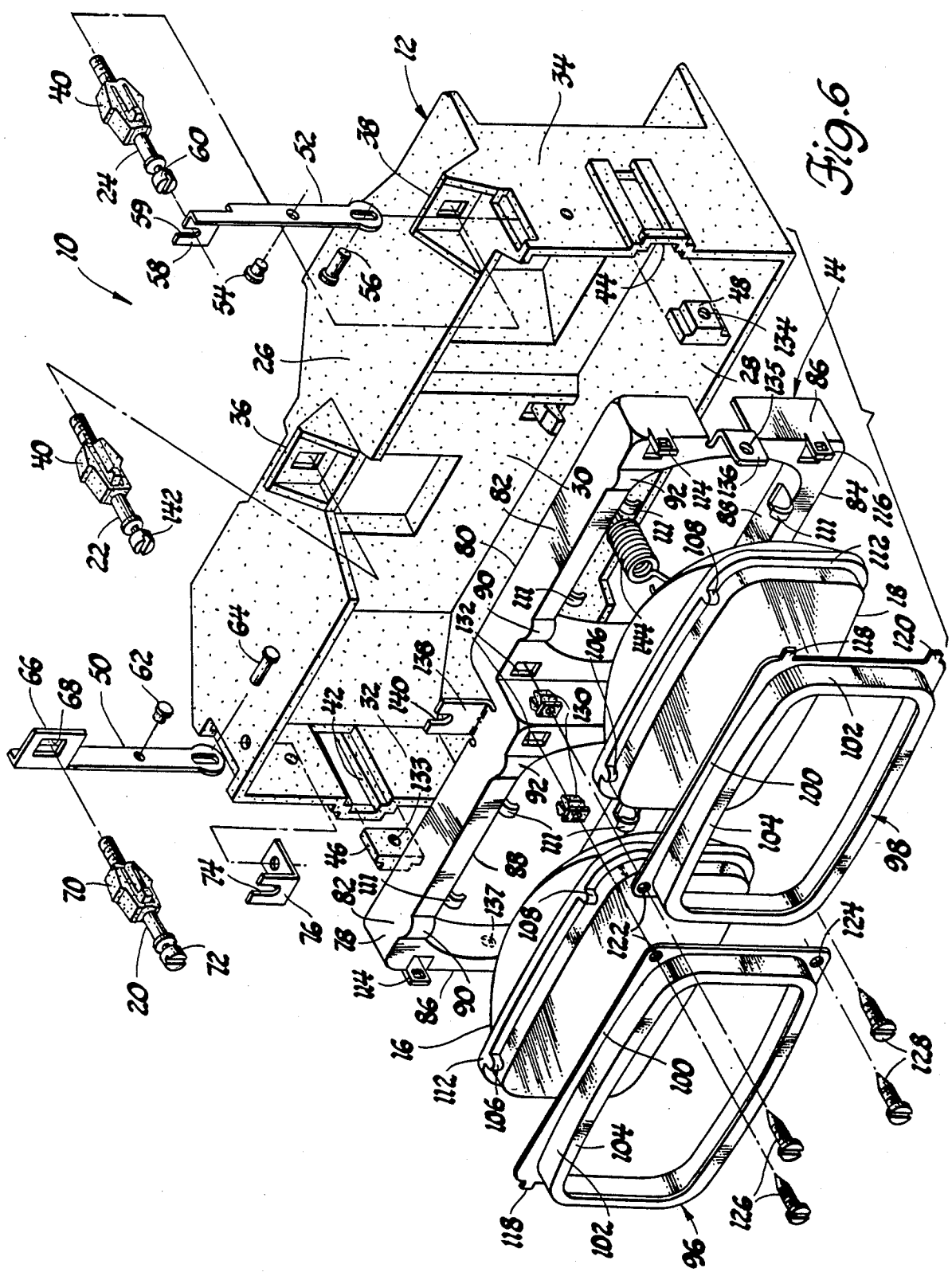

VEHICLE HEADLAMP ASSEMBLY

This is a continuation-in-part application of U.S. Ser. No. 678,026 filed on Dec. 4, 1984, now abandoned.

This invention concerns a headlamp assembly attachable to the front end of an automobile body and more particularly pertains to a headlamp assembly that is provided with a pair of headlamp units adapted to be simultaneously adjusted about three pivot axes.

More specifically, the headlamp assembly according to the present invention includes a support housing having a support bracket which carries a pair of headlamp units in side-by-side relationship. The support bracket is located within a cavity formed in the support housing and is connected to the latter for movement about three pivot axes. The support bracket comprises a pair of side edges, a top edge and a bottom edge while the support housing is defined by a pair of laterally spaced side walls, a top wall and a bottom wall. A horizontally extending guide track is formed in each of the side walls of the support housing between the top wall and the bottom wall and serves to accommodate a block member for sliding movement relative to the associated side wall. The block members mounted in the side walls of the support housing serve as mounting means for connecting the support bracket to the support housing for pivotal movement about a horizontal axis. A first adjustment screw is provided between the top edge of the support bracket and the top wall of the support housing for causing pivotal movement of the support bracket so that adjustment of the headlamp units is realized about the horizontal axis. In addition, a second adjustment screw and a third adjustment screw are provided between the respective block members for causing selective sliding in-and-out movement of each of the block members so that adjustment of the support bracket containing the headlamp units can be realized about two inclined pivot axis in addition to the horizontal axis. The arrangement is such that when it is desired to aim the pair of headlamp units about a vertical axis, one of the block members is first shifted along the accommodating guide track in one direction by rotation of the associated adjustment screw so as to pivot the support bracket about one of the inclined axes, followed by opposite rotation of the first adjustment screw so as to again pivot the support bracket about the horizontal axis and thereby properly aim the headlamp units about the vertical axis.

The objects of the present invention are to provide a new and improved headlamp assembly that includes a generally rectangular support housing having a pair of side walls, each of which is provided with a block member that supports a headlamp support bracket for sliding in-and-out movement so as to pivot the support bracket about an inclined axis and also allows pivotal movement about a horizontal axis so as to provide adjustable positioning of a pair of headlamp units about the horizontal axis and a vertical axis; to provide a new and improved headlamp assembly which includes a support bracket that carries a pair of headlamp units in side-by-side relationship and is attached to a support housing at three pivot points so as to allow simultaneous adjustable positioning of the pair of headlamp units about a horizontal axis or a vertical axis; and to provide a new and improved headlamp assembly in which a pair of side-by-side located headlamp units can be simultaneously adjustably positioned about three axes through three adjustment screws to achieve adjustment about a horizontal axis and a vertical axis, and in which two of the adjustment screws are connected to slidable block members which define a pair of laterally spaced and horizontally aligned first and second pivots and the third adjustment screw, which has the head thereof serving as a third pivot, is located above and between the first and second pivots.

The above and other objects of the present invention will be apparent from the following detailed description when taken in conjunction with the accompanying drawings in which:

FIG. 1 is a front elevational view of a headlamp assembly made in accordance with the present invention;

FIG. 2 is a plan view of the headlamp assembly taken on line 2—2 of FIG. 1;

FIG. 3 is a side elevational view of the headlamp assembly taken on line 3—3 of FIG. 1;

FIG. 4 is a fragmentary sectional view taken on line 4—4 of FIG. 1;

FIG. 5 is a side elevational view of the headlamp assembly taken on line 5—5 of FIG. 1;

FIG. 6 is an exploded view of the headlamp assembly shown in FIGS. 1 through 5; and FIG. 7 is a side elevational view similar to the view shown in FIG. 5 but shows a modified form of block member incorporated with the associated side wall of the support housing.

Referring to the drawings and more particularly FIGS. 1 through 5 thereof, a headlamp assembly 10, according to the present invention, is shown comprising, in general, a support housing 12, a headlamp support bracket 14 and a pair of rectangular vehicle headlamp units 16 and 18 mounted within the support bracket 14. The headlamp assembly 10 includes three adjustment screws 20, 22, and 24 which serve to adjustably position the headlamp support bracket 14 and the supported headlamp units 16 and 18 about a horizontal axis A and a pair of inclined axes B and C, all of which are located in a single plane passing through the horizontal axis A as seen in FIG. 2. Thus, as will be more fully explained hereinafter, by appropriate rotation of the adjustment screws 20, 22, and 24, the headlamp units 16 and 18 can be properly aimed about a horizontal axis as well as a vertical axis passing through the point of intersection of the axes B and C.

More specifically, as seen in FIG. 6 the support housing 12 is formed from a plastic material and includes a top wall 26, a bottom wall 28, a back wall 30, and a pair of laterally spaced and parallel side walls 32 and 34, all of which cooperate to define a rectangular cavity. The top wall 26 is integrally formed with a pair of upstanding ears 36 and 38, each of which has a rectangular opening therein for rigidly retaining a snap-in type self-retaining plastic nut 40. In addition, the side walls 32 and 34 are respectively formed with identical horizontally extending tracks 42 and 44 each of which takes the form of a hat-shaped groove when viewed in cross section. The tracks 42 and 44 accommodate a pair of identical block members 46 and 48, respectively, each of which is adapted to be retained within and slide horizontally in the associated track.

The side walls 32 and 34 also support a pair of pivotable levers 50 and 52, respectively. As best seen in FIGS. 2 and 5, the lever 52 has the intermediate portion thereof pivotally connected to the side wall 34 by a pin 54. The lower end of the lever 52 is pivotally connected to the block member 48 by a pin 56 while the upper end of the lever 52 is formed with a flange 58 provided with a vertically oriented slot 59. The slot 59 receives the head 60 of the adjustment screw 24 which, in turn, is threadably received by the nut 40 mounted in the ear 38. As is conventional, the head 60 of adjustment screw 24 is retained by the flange 58 in a manner that allows it to be rotatable within the slot 59 but not be axially movable relative to the flange 58.

As seen in FIGS. 2 and 3, the intermediate portion of the lever 50 is pivotally connected to the side wall 32 by a pin 62 while the lower end of the lever 50 is pivotally connected to the block member 46 by a pin 64. The top end of the lever 50 is formed with a flange 66 having a square opening 68 which receives and retains a plastic nut 70 identical to nuts 40 mounted in the ears 36 and 38. The adjustment screw 20 extends into and is threadably received by the nut 70. As is the case with head 60 of screw 24, the head 72 of the adjustment screw 20 is mounted for rotation but not relative axial movement in a vertically oriented slot 74 formed in an L-shaped bracket 76 rigidly fixed to the top wall 26 of the support housing 12 by a rivet, not shown.

The support bracket 14 is formed from a sheet metal stamping and comprises a pair of offset and integrally interconnected lamp support sections 78 and 80 that are generally rectangular in configuration as seen in FIG. 6. Each of the lamp support sections 78 and 80 has a top edge 82, a bottom edge 84, and a side edge 86. An opening 88 is formed in each of the lamp support sections 78 and 80 of the support bracket 14 through which the rear ends of the headlamp units 16 and 18 project for electrical connection with the usual socket of the wire harness of the vehicle. As seen in FIGS. 1 and 6, the front face of each lamp support section 78 and 80 is formed with three projections 90, 92 and 94 which define a plane adapted to cooperate with the associated retainer 96 or 98 for properly locating the headlamp units 16 and 18. In this regard, each retainer 96 and 98 includes a radially outwardly extending flange 100 which is integral with a generally rectangular ring portion 102 formed with a radially inwardly extending rim portion 104. The rear planar surface of the flange 100 is adapted to seat against the projections 90, 92 and 94, and defines a plane which is parallel to the plane of the rim 104. Both the plane of the flange 100 and the plane of the rim 104 are intended to coincide with the aiming plane of the associated lamp unit. The aiming plane of the headlamp units 16 and 18, in each case, is defined by the three aiming pads 106, 108 and 110 on the front of a radially extending flange 112 which is integral with and surrounds each of the lamp units 16 and 18 as seen in FIGS. 1 and 6. Thus, when it is necessary to replace a headlamp unit, the headlamp aiming plane as defined by the aiming pads 106, 108, 110 will be placed in the identical location as the old headlamp unit relative to the vehicle. Also the fact that the support bracket 14 will carry both the lower beam and the upper beam headlamp units, which in this instance are respectively represented by the units 16 and 18, both headlamp units can be adjusted together. This is possible as a direct result of making the aiming plane and the seating plane coincident.

Further relative to the headlamp aiming feature of the headlamp assembly 10, it will be noted that each outer side edge 86 of the support bracket 14 is provided with a pair of vertically spaced ears 114 and 116 which are adapted to receive a pair of tangs 118 and 120, respectively that are integral with the flange 100 of the associated retainer 96 or 98. As aforementioned, each retainer has a rim 104 located in a plane parallel to the planar rear surface of the flange 100. As also mentioned, to position the headlamp properly the aiming pads 106, 108 and 110 of the associated headlamp unit are required to be seated against the rim 104 and, in this regard, four spring members 111 (two at the upper part of the opening 88 and two directly below and at the lower part of opening 88) are provided on the face of each lamp section 78 and 80. The spring members 111 extend into the opening 88 for engaging the rear surface of the flange 112 of the associated headlamp unit and serve to bias the latter towards the associated retainer so as to press the aiming pads 106, 108, and 110 into engagement with the plane of the rim 104 of the associated retainer. Also, the flange 100 of the rim 104 has a pair of vertically spaced holes 122 and 124 through which the screws 126 and 128 extend respectively for threadable engagement with self-retaining plastic nuts 130 which are adapted to be fixed within accommodating rectangular openings 132 formed in the face of each lamp section 78 and 80 of the support bracket 14. Thus, when the two headlamp units 16 and 18 are located in the two openings 88, 88 of the lamp sections 78 and 80 of support bracket 14 and each retainer 96 and 98 has the tangs 118 and 120 thereof located in the ears 114 and 116, the screws 126 and 128 of each retainer are tightened so that the rear planar surface of flange 100 is seated on the associated three projections 90, 92 and 94 of the support bracket 14. At the same time, the spring members 111 urge the associated headlamp unit forwardly so the aiming pads 106, 108, and 110 thereof seat against the plane of the associated rim 104 and thereby automatically locate the headlamp unit. As should be apparent, if the support bracket 14 is adjusted in position for proper aiming of the headlamp units 16 and 18, then each of the headlamp units 16 and 18 will be automatically aimed when replaced in the support bracket 14 as described above.

The support bracket 14 is pivotally supported in the support housing 12 by the pivot pins 64 and 56 which not only extend through the respective holes 133 and 134 in the block members 46 and 48 and through the slots in lower ends of the levers 50 and 52, but also serve to connect the support bracket 14 to the support housing 12. Thus, as seen in FIG. 6, the pin 56 extends through the hole 135 formed in a forwardly projecting tab 136 along the side edge 86 of lamp section 80 of the support bracket 14 while the pin 64 extends through a hole 137 formed in the opposite side edge 86 of lamp section 78 of the support bracket 14. In this manner, the support bracket 14 is supported for pivotal movement about the horizontal axis A which passes through the longitudinal center of the pin 56 and 64. It will also be noted that an upwardly projecting tab 138 is integral with the top edge 82 of the lamp section 78 of support bracket 14 and is formed with an open slot 140. The head 142 of the adjustment screw 22, as seen in FIGS. 1 and 2, is rotatably retained by the slot 140 in the manner of heads 60 and 72 and is located at the point of intersection of the inclined axes B and C. Finally, as seen in FIG. 4, a tension spring 144 is provided which connects the bottom edge 84 of the support bracket 14 to the back wall 30 of the support housing 12 so as to remove any slack which may exist when all of the parts of the headlamp assembly 10 are assembled as seen in FIGS. 1 and 2. Thus, the spring 144 removes all slack from the assembly 10 so as to assure that the heads 60, 72 and 142 of the adjustment screws are firmly seated in the accommodating slot.

From the above description, it should be apparent that when the adjustment screw 22 is rotated in one direction or the other, the support bracket 14 will be pivoted about the pins 56 and 64 so as to adjust the headlamp units 16 and 18 about the horizontal axis A. If it is desired to adjust the position of the headlamp units 16 and 18 about a vertical axis, first the adjustment screw 24 will be rotated to advance the screw 24 into the nut 40, for example as seen in FIG. 5, to cause the lever 52 to move clockwise about the pin 54 resulting in the block member 48 moving forwardly or to the left so that initially the support bracket 14 will be pivoted about the inclined axis B. Then the adjustment screw 22 will be rotated to retract the screw 22 from the associated nut 40 so that the headlamp units are pivoted counterclockwise as seen in FIG. 5 about horizontal axis A. In this manner, the adjustment of the support bracket 14 and accordingly headlamp units 16 and 18 is realized about the vertical axis passing through the point of intersection of the axes B and C so as to achieve the desired aim of the headlamp units. As should be apparent, adjustment of the headlamp units 16 and 18 about a vertical axis can also be achieved by first advancing or retracting the adjustment screw 20 followed by opposite movement of the adjustment screw 22.

An alternate design of the block members 46 and 48 and the associated adjustment screws can be seen in FIG. 7. In this case, rather than having a lever system such as seen in FIGS. 3 and 5 with the adjustment screws 20 and 24 located adjacent the top wall 26, a block member 150 in the form of a cylinder can be provided in each side wall 32 and 34 of the support housing 12, that is slidably received within a rectangular opening 152 formed in a plate 154 secured to the associated side wall. As in the case with the block members 46 and 48, the tab 136 and the side edge 86 of the support bracket 14 can be respectively connected to the associated block members 150 by the pivot pins such as the pivot pins 56 and 64. In addition, the plate 154 is formed with a flange 156 which supports the head 158 of an adjustment screw 160 for rotation about the longitudinal center axis of the screw 160 but prevents axial movement of the screw 160 relative to the plate 154. The threaded shank of the screw 160 is threadably received by the block member 150 so that upon rotation of the screw 160 in one direction, the block member 150 will move horizontally to the right within the opening 152 as seen in FIG. 7, while rotation of the screw 160 in the opposite direction will cause the block member 150 to move horizontally to the left within the opening 152 so as to cause adjustable positioning of the headlamp units 16 and 18 in the manner of the adjustment screw 24 shown in FIG. 5.

Various changes and modifications can be made in the construction of this headlamp assembly without departing from the spirit of the invention. Such changes and modifications are contemplated by the inventors, and they do not wish to be limited except by the scope of the appended claims.

The embodiments of the invention in which an exclusive property or privilege is claimed are defined as follows.

1. A headlamp assembly adapted to be attached to a vehicle body at the front end thereof for adjustable aiming movement about three pivot axes, said headlamp assembly including a support housing, a support bracket located within said support housing and adapted to support a pair of headlamp units in side by side relationship, said support bracket comprising a pair of side edges, a top edge and a bottom edge, said support housing including a pair of side walls, a top wall and a bottom wall which define a cavity for receiving said support bracket, a horizontally extending guide track formed in each of said pair of side walls of said support housing between said top wall and said bottom wall, each of said guide tracks supporting a block member for sliding movement relative to the associated side wall, pivot means connecting said block member of each of said side walls to said pair of said side edges of said support bracket so as to provide first and second pivot points which are horizontally aligned and laterally spaced to allow pivotal movement of said support bracket about a horizontal axis, a first adjustment screw carried by said support housing and connected to the block member providing said first pivot point, a second adjustment screw carried by said support housing and connected to the block member providing the second pivot point, and a third adjustment screw connecting said top edge of the support bracket to said top wall of said support housing, said third adjustment screw having a head providing a third pivot point, the arrangement being such that rotation of said third adjustment screw causes said support bracket to be adjusted about said horizontal axis while rotation of said first or second adjustment screws causes said support bracket to be adjusted about an inclined axis passing through said first and third pivot points and about an inclined axis passing through said second and third pivot points respectively so that subsequent rotation of said third adjustment screw causes said support bracket to be adjusted about a verticle axis.

2. A headlamp assembly adapted to be attached to a vehicle body at the front end thereof for adjustable aiming movement about three pivot axes, said headlamp assembly including a rectangular support housing, a rectangular support bracket located within said support housing and adapted to support a pair of rectangular headlamp units in side by side relationship, said support bracket comprising a pair of side edges, a top edge and a bottom edge, said support housing including a pair of side walls, a top wall and a bottom wall which define a cavity for receiving said support bracket, a horizontally extending guide track formed in each of said pair of side walls of said support housing located midway between said top wall and said bottom wall, each of said guide tracks supporting a block member for sliding movement relative to the associated side wall, pivot means connecting said block member of each of said side walls to said pair of said side edges of said support bracket so as to provide first and second pivot points which allow pivotal movement of said support bracket about a horizontal axis, a first adjustment screw carried by said support housing and connected to the block member providing said first pivot point, a second adjustment screw carried by said support housing and connected to the block member providing the second pivot point, and a third adjustment screw between said first and second adjustment screws and at a level above said horizontal axis connecting said top edge of the support bracket to said top wall of said support housing, said third adjustment screw having a head providing a third pivot point, the arrangement being such that rotation of said third adjustment screw causes said support bracket to be adjusted about said horizontal axis while rotation of said first or second adjustment screws causes said support bracket to be adjusted about an inclined axis passing through said first and third pivot points and about an inclined axis passing through said second and third pivot points respectively whereby subsequent rotation of said third adjustment screw causes said support bracket to be adjusted about a verticle axis.

3. A headlamp assembly adapted to be attached to a vehicle body at the front end thereof for adjustable aiming movement about three pivot axes, said headlamp assembly including a support housing, a support bracket located within said support housing and adapted to support a pair of headlamp units in side by side relationship, said support bracket comprising a pair of side edges, a top edge and a bottom edge, said support housing including a pair of side walls, a top wall and a bottom wall which define a cavity for receiving said support bracket, a horizontally extending guide track formed in each of said pair of side walls of said support housing between said top wall and said bottom wall, each of said guide tracks supporting a block member for sliding movement relative to the associated side wall, pivot means connecting said block member of each of said side walls to said pair of said side edges of said support bracket so as to provide first and second pivot points which are horizontally aligned and laterally spaced to allow pivotal movement of said support bracket about a horizontal axis, a first lever pivotally connected to one of said pair of side walls and having one end thereof connected to the associated block member on said one of said pair of side walls, a first adjustment screw carried by said support housing and connected to the other end of said first lever, a second lever pivotally connected to the other of said pair of side walls and having one end thereof connected to the associated block member on said other of said pair of side walls, a second adjustment screw carried by said support housing and connected to the other end of said second lever, and a third adjustment screw connecting said top edge of the support bracket to said top wall of said support housing, said third adjustment screw having a head providing a third pivot point, the arrangement being such that rotation of said third adjustment screw causes said support bracket to be adjusted about said horizontal axis while rotation of said first or second adjustment screws causes the associated lever to move the associated block member so that said support bracket is adjusted about an inclined axis passing through said first and third pivot points and about an inclined axis passing through said second and third pivot points respectively whereby subsequent rotation of said third adjustment screw causes said support bracket to be adjusted about a verticle axis.

* * * * *